United States Patent [19]

Nakamura et al.

[11] Patent Number: 4,663,886
[45] Date of Patent: May 12, 1987

[54] AUTOMOTIVE DOOR WINDOW PANE GUIDE DEVICE

[75] Inventors: Takeshi Nakamura; Hiroshi Ujihara, both of Yokohama, Japan

[73] Assignee: Ohi Seisakusho Co., Ltd., Yokohama, Japan

[21] Appl. No.: 791,062

[22] Filed: Oct. 24, 1985

[30] Foreign Application Priority Data

Oct. 25, 1984 [JP] Japan .................. 59-160353[U]

[51] Int. Cl.$^4$ ............................................. E05F 11/00
[52] U.S. Cl. ........................................ 49/360; 49/352
[58] Field of Search ............... 49/352, 360, 227, 349, 49/376, 374

[56] References Cited

U.S. PATENT DOCUMENTS 4,494,336 1/1985 Ishii .................................... 49/374

FOREIGN PATENT DOCUMENTS 3341872 5/1984 Fed. Rep. of Germany ........ 49/349
1448795 9/1976 United Kingdom .................. 49/352

Primary Examiner—Kenneth J. Dorner
Assistant Examiner—Gerald A. Anderson
Attorney, Agent, or Firm—Schwartz, Jeffery, Schwaab, Mack, Blumenthal & Evans

[57] ABSTRACT

Herein disclosed is an improved door window pane guide device which comprises a guide rail having a substantially right-angled side wall which is curled at its leading end portion to form a tubular guide portion, and a carrier unit which is movable along the guide rail together with a window pane secured to the carrier unit. The carrier unit has two plastic sliders which are respectively formed with aligned rectangular grooves into which the tubular guide portion of the guide rail is slidably received upon assembly of the window pane guide device. In order to prevent disengagement of the first and second sliders from the tubular guide portion of the guide rail, an axially extending lug portion is formed on each of the first and second sliders to narrow the entrance portion of the groove, or another slider is arranged between the first and second sliders, which has a right-angled head which slidably engages with the tubular guide portion in a manner to restrict displacement of the first and second sliders in a direction away from the tubular guide portion.

3 Claims, 11 Drawing Figures

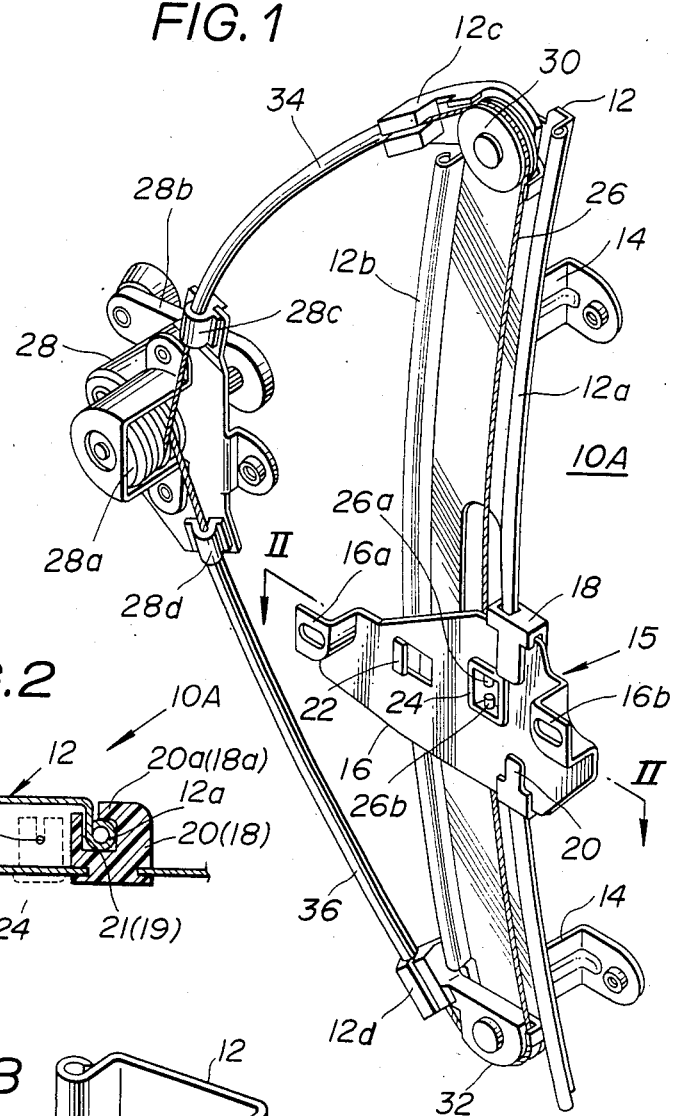
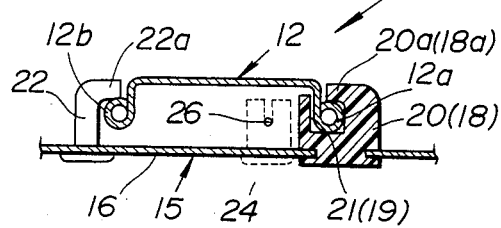
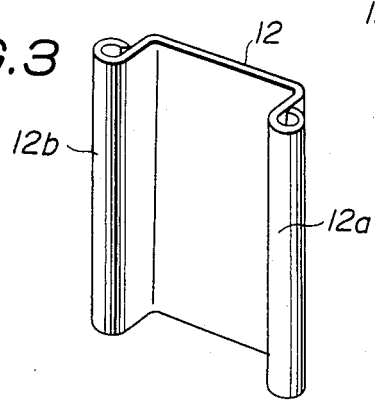

AUTOMOTIVE DOOR WINDOW PANE GUIDE DEVICE

BACKGROUND OF THE INVENTION

1. Field of the Invention

The present invention relates in general to an automotive door window regulator, and more particularly to a window pane guide device for use in the regulator, which guides movement of a window pane relative to the door.

2. Description of the Prior Art

Hitherto, various kinds of window pane guide devices have been proposed and put into practical use in the field of the automotive window regulators. However, due to the inherent construction of such conventional guide devices, a problem has been encountered that the window pane is subject to a considerable amount of play during the movement of the vehicle. As a matter of course, the play of the window pane not only generates noise but also detracts from the aesthetic appearance of the vehicle.

SUMMARY OF THE INVENTION

Therefore, it is an object of the present invention to provide a window pane guide device which is free of the above-mentioned problem.

It is another object of the present invention to provide a window pane guide device which can suppress or at least minimize a play of the window pane in a direction perpendicular to the major surface of the window pane.

According to the present invention, there is provided a window pane guide device for use in an automotive window regulator mounted in an automotive door, the window pane guide device comprising a guide rail secured to the door and having at one side a substantially right-angled side wall which extends along the longitudinal axis of the guide rail, the side wall being curled at its leading end portion to form a tubular guide portion which extends along the longitudinal axis of the guide rail, a carrier unit including a base plate, first and second sliders secured to the base plate and having respective aligned rectangular grooves into which the tubular guide portion of the guide rail is slidably received upon assembly, and a third slider secured to the base plate at the position remote from the first and second sliders and having a head which slidably contacts with the other side of the guide rail in a manner to prevent displacement of the carrier unit in a direction away from the guide rail, and means for preventing disengagement of the first and second sliders from the tubular guide portion even when an external force is applied to the carrier unit in a direction to disengage the first and second sliders from the tubular guide portion of the guide rail.

BRIEF DESCRIPTION OF THE DRAWINGS

Other objects and advantages of the present invention will become apparent from the following description when taken in conjunction with the accompanying drawings, in which:

FIG. 1 is a perspective view of a window pane guide device of a first embodiment of the present invention;

FIG. 2 is a sectional view of a carrier unit incorporated with a guide rail, which is taken along the line II—II of FIG. 1;

FIG. 3 is a partial perspective view of the guide rail employed in the invention;

DETAILED DESCRIPTION OF THE INVENTION

Figure 4:
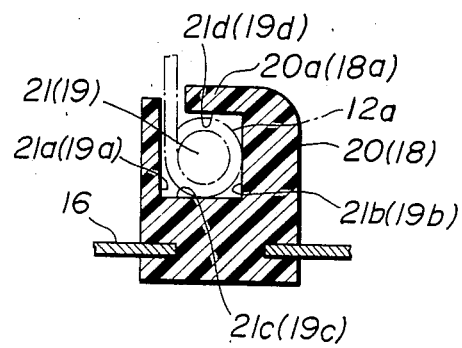
FIG. 4 is an enlarged sectional view of a plastic slider employed in the carrier unit of FIG. 2.

Referring to FIGS. 1 to 4, particularly FIG. 1, there is shown a window pane guide device of a first embodiment of the present invention, which is generally designated by numeral 10A.

The guide device 10A comprises an elongate guide rail 12 of metal which is securely connected through suitable brackets 14 to an inner panel (now shown) of an automotive door and extends generally vertically. As is seen from FIG. 2, the guide rail 12 is formed with substantially right-angled parallel side walls, each being curled outwardly at the leading end portion to form a tubular guide portion 12a or 12b which extends along the longitudinal axis of the guide rail 12.

Slidably guided by the guide rail 12 is a carrier unit 15 which carries a window pane (not shown) to move therewith. The carrier unit 15 comprises a base plate 16 of metal which is formed with two apertured raised portions 16a and 16b to which the window pane is secured by bolts (not shown). The base plate 16 is equipped at its upper and lower portions with aligned sliders 18 and 20 of plastics which are slidably engaged with the tubular guide portion 12a of the guide rail 12 in such a manner as will be described hereinnext.

As is understood from FIG. 2, each of the sliders 18 and 20 is formed with an axially extending rectangular groove 19 or 21 which is sized to slidably receive therein the tubular guide portion 12a of the guide rail 12. That is, as is best understood from FIG. 4, each groove 21 or 19 has a substantially square cross section and thus comprises a first pair of opposed inner walls 21a (or 19a) and 21b (or 19b) which are arranged to be substantially perpendicular to the major surface of the base plate 16, and a second pair of opposed inner walls 21c (or 19c) and 21d (or 19d) which are arranged to be substantially parallel to the major surface of the base plate 16. The entrance portion of each groove 21 (or 19) is narrowed by an axially extending lug 20a (or 18a) which defines the inner wall 21d (or 19d) of the groove 21 (or 19), as shown.

Upon assembly, the carrier unit 15 is brought into engagement with the guide rail 12 by putting the tubular guide portion 12a of the guide rail 12 into the grooves 19 and 21 from the upper or lower end of the guide rail 12. As will be seen from FIG. 2, that is, the lug 20a (or 18a) of each slider 20 (or 18) is sized to prevent disengagement of the slider from the tubular guide portion 12a through the narrowed entrance of the groove.

The base plate 16 is further equipped with another slider 22 of plastics which, as is seen from FIG. 2, has a substantially right-angled head 22a which is in slidable contact with the other tubular guide portion 12b of the guide rail 12. Thus, it will be appreciated that the carrier unit 15 is movable along the guide rail 12 with the sliders 18 and 20 and the slider 22 guided by the tubular guide portions 12a and 12b.

The base plate 16 is further equipped with a cable retainer 24 of plastics. Upon assembly, both ends 26a and 26b of a control cable 26 are retained by the retainer 24. It is to be noted that the carrier unit 15 is produced by placing the base plate 16 in a mould and moulding the plastic sliders 18, 20 and 22 and the retainer 24 directly onto the base plate 16 while in the mould.

As is seen from FIG. 1, the control cable 26 is wound at its generally middle section on a drive roller 28a of a known drive device or cable mover 28 mounted to the door. Designated by numeral 28b is a handle of the drive device 28, which, when rotated, rotates the drive roller 28a in a certain direction. A guide pulley 30 is rotatably connected to the upper end of the guide rail 12, and a semi-circular guide member 32 is fixed to the lower end of the guide rail 12. The control cable 26 is put on these guide members 30 and 32. Sleeves 34 and 36 are used for smoothly guiding the movement of the control cable 26, one extending from the upper portion of the guide rail 12 to the drive device 28, and the other extending from the lower portion of the guide rail 12 to the drive device 28. For supporting the sleeve 34, holding portions 12c and 28c are formed on the guide rail 12 and the drive device 28, which grip the ends of the sleeve 34, as shown. For the same purpose, the other holding portions 12d and 28d are formed on the guide rail 12 and the drive device 28, which grip the ends of the other sleeve member 36.

When, in operation, the handle 28b of the drive device 28 is rotated in a certain direction, that is, for example, in a clockwise direction in FIG. 1, the drive roller 28a of the drive device 28 winds thereon the upper section of the cable 26 while releasing the lower section of the cable 26 therefrom. With this, the carrier unit 15 and thus the window pane fixed thereto are moved upward closing a window opening (not shown) of the door. When, on the contrary, the handle 28b of the drive device 28 is rotated in the opposite direction, that is, in a counterclockwise direction in FIG. 1, the carrier unit 15 and the window pane are moved downward opening the window opening.

It is to be noted that during the movement of the carrier unit 15, the forward and rearward play of the same, that is, the play in a direction parallel to the major surface of the window pane is suppressed or at least minimized by the slidable engagement between the tubular guide portion 12a of the guide rail 12 and the first pair of opposed inner walls 21a (or 19a) and 21b (or 19b), while, the lateral play of the carrier unit 15, that is, the play in a direction perpendicular to the major surface of the window pane is suppressed or at least minimized by the slidable engagement between the tubular guide portion 12a of the guide rail 12 and the second pair of opposed inner walls 21c (or 19c) and 21d (or 19d). This advantageous phenomenon will be well understood from FIG. 4 in which the tubular guide portion 12a is shown by a phantom line.

Figure 6:
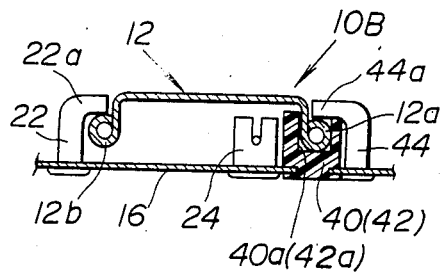
FIG. 6 is a sectional view taken along the line VI—VI of FIG. 5.
Figure 5:
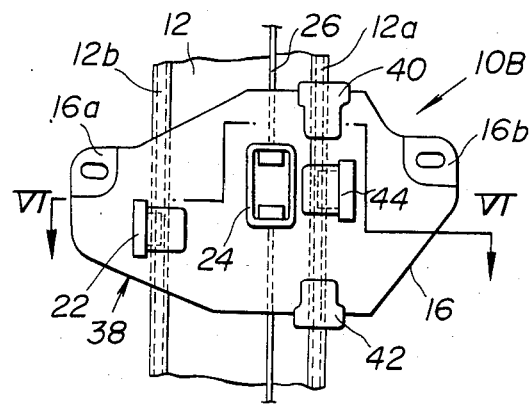
FIG. 5 is a partial plan view of a window pane guide device of a second embodiment of the present invention.

Referring to FIGS. 5 and 6, there is shown a second embodiment of the present invention. Substantially the same parts and constructions as those in the first embodiment of FIGS. 1 to 4 are designated by the same numerals.

The window pane guide device 10B of this second embodiment comprises an elongate guide rail 12 which is identical to that of the first embodiment and a carrier unit 38 which is somewhat different in construction from that of the first embodiment as will be described hereinnext.

The carrier unit 38 comprises a base plate 16 formed with two apertured raised portions 16a and 16b to which a door window pane (not shown) is bolted. Similar to the first embodiment, the base plate 16 is equipped with a plastic slider 22 which is slidably engaged with the tubular guide portion 12b of the guide rail 12, and a plastic retainer 24 which retains both ends of the control cable 26 extending from the drive device 28 (see FIG. 1). The base plate 16 is equipped with aligned sliders 40 and 42 of plastics at its upper and lower portions, which are slidably engaged with the other tubular guide portion 12a of the guide rail 12 in such a manner as will be described hereinnext.

Figure 7:
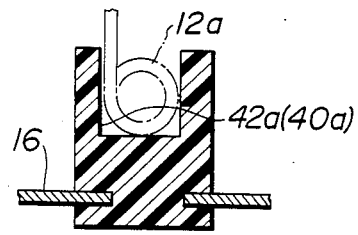
FIG. 7 is an enlarged sectional view of a plastic slider employed in the carrier unit of FIG. 5.

As will be seen from FIG. 6, each of the sliders 42 and 40 is formed with an axially extending rectangular groove 42a (or 40a) into which the tubular guide portion 12a is slidably received. As is best seen from FIG. 7, each groove 42a (or 40a) of the slider 42 (or 40) of this second embodiment is free of a portion corresponding to the axially extending lug 20a (or 18a) of the first embodiment. That is, unlike the case of the first embodiment, the entrance portion of each groove 42a (or 40a) is not narrowed in the second embodiment.

In order to prevent the lateral play of the carrier unit 38 relative to the door proper, still another plastic slider 44 is equipped to the base plate 16 at the position between the upper and lower sliders 40 and 42, which has a substantially right-angled head 44a slidably contacting with the tubular guide portion 12a of the guide rail 12. Upon assembly, the right-angled head 44a of the slider 44 is in slidable contact with the tubular guide portion 12a of the guide rail 12.

Referring to FIGS. 8A, 8B, 8C and 8D, there are shown third, fourth, fifth and sixth embodiments of the present invention.

Figure 8A:
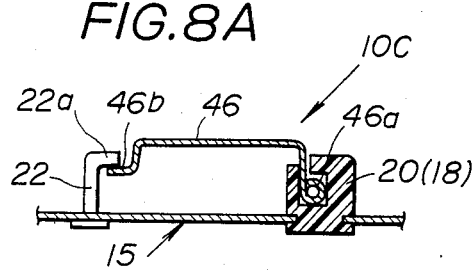
FIGS. 8A, 8B, 8C and 8D are sectional views similar to FIG. 2, but showing third, fourth, fifth and sixth embodiments of the present invention.
Figure 8C:
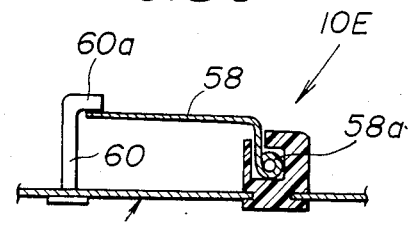

In the third embodiment of FIG. 8A, the guide rail 46 is formed with only one tubular guide portion 46a. As shown, the other side wall of the guide rail 46 is formed with a longitudinally extending stepped portion 46b. Upon assembly, the carrier unit 15 identical to that of the first embodiment is incorporated with the guide rail 46 having the plastic sliders 18 and 20 slidably engaged with the tubular guide portion 46a and the other plastic slider 22 slidably engaged with the longitudinally extending stepped portion 46b.

Figure 8B:
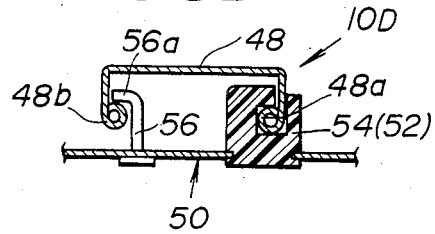
Figure 8D:
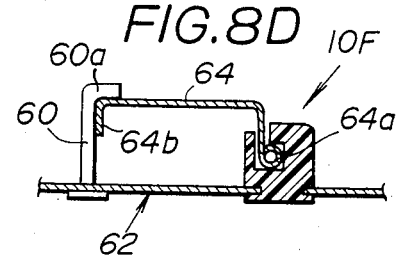

In the fourth embodiment of FIG. 8B, the guide rail 48 is formed with substantially right-angled side walls, each being curled inwardly at the leading end to form a tubular guide portion 48a or 48b. Each rectangular groove of the plastic slider 54 or 52 of the carrier unit 50 is shaped to slidably receive the tubular guide portion 48a, placing the narrowed entrance portion thereof outwardly. A right-angled head 56a of the other plastic slider 56 is directed outwardly to be in slidable contact with the other tubular guide portion 48b.

The window pane guide devices of the fifth and sixth embodiments are very similar to that of the third embodiment of FIG. 8A. That is, in the fifth embodiment of FIG. 8C, one side of the guide rail 58 is flush with the major portion of the same, which is in slidable contact with a right-angled head 60a of a plastic slider 60 of the carrier unit 62. In the sixth embodiment of FIG. 8D, one side 64b of the guide rail 64 is bent perpendicular to the major portion of the rail 64, which is in slidable contact with the shank portion of the plastic slider 60.

Although the foregoing description is directed to the guide rail having a "tubular" guide portion (12a, 12a, 46a, 48a, 58a and 64a) with which the two grooved plastic sliders of the carrier unit (15, 38, 15, 50, 62 and 62) are slidably engaged, it is also possible to use a guide rail having a "channel" shaped guide portion.

As is described hereinabove, in accordance with the present invention, the forward and rearward play of the window pane is suppressed or at least minimized by the engagement between the tubular guide portion of the guide rail and the first pair of opposed inner walls of the upper and lower sliders of the carrier unit, and the lateral play of the window pane is suppressed or at least minimized by the engagement between the tubular guide portion of the guide rail and the second pair of opposed inner walls of the rectangular grooves of the sliders (or between the tubular guide portion and the other slider 44 in case of the second embodiment 10B of FIGS. 5 and 6).

What is claimed is:

1. A window pane guide device for use with an automotive window regulator mounted in an automotive door, comprising:

a guide rail having first and second sides, said guide rail being secured to said door and having at a first side a substantially right-angled side wall which extends along the longitudinal axis of said guide rail, said side wall being curled at its leading end portion to form a tubular guide portion, said tubular guide portion having a front and a back and extending along the longitudinal axis of said guide rail; and a carrier unit including a base plate, first and second sliders secured to said base plate, each of said first and second slides having a rectangular groove slidably surrounding the tubular guide portion of the guide rail from the front thereof, a third slider secured to said base plate at a position remote from said first and second sliders and having a head slidably contacting with the second side of said guide rail in a manner to prevent displacement of said carrier unit in a direction away from said guide rail, and a fourth slider secured to said base plate at a position between said first and second sliders and having a head which extends in a direction to slidably engage with the back of said tubular guide portion to restrict displacement of said first and second sliders in a direction away from said tubular guide portion of said guide rail.

2. A window pane guide device as claimed in claim 1, in which said first, second, third and fourth sliders are constructed of plastics.

3. A window pane guide device as claimed in claim 1, in which said carrier unit is further equipped with a cable retainer which retains both ends of a control cable which extends from a cable mover.

* * * * *